United States Patent [19]

Newhouse et al.

[11] Patent Number: 5,363,234
[45] Date of Patent: Nov. 8, 1994

[54] AMPLIFIER HAVING PUMP FIBER FILTER

[75] Inventors: Mark A. Newhouse; Miles E. Vance, both of Corning; Thomas W. Webb, Horseheads, all of N.Y.

[73] Assignee: Corning Incorporated, Corning, N.Y.

[21] Appl. No.: 135,624

[22] Filed: Oct. 14, 1993

[51] Int. Cl.⁵ .................... G02B 6/26; H01S 3/30
[52] U.S. Cl. .................... 359/341; 359/337; 372/6
[58] Field of Search .............. 359/337, 341; 372/6, 372/70–72; 385/5

[56] References Cited

U.S. PATENT DOCUMENTS

| | | | |
|---|---|---|---|
| 3,416,089 | 12/1968 | Koester et al. | 359/341 |
| 5,008,887 | 4/1991 | Kafka et al. | 372/6 |
| 5,067,789 | 11/1991 | Hall et al. | 359/341 |
| 5,083,874 | 1/1992 | Arder et al. | 385/24 |
| 5,115,338 | 5/1992 | DiGiovanni et al. | 359/337 |
| 5,131,069 | 7/1992 | Hall et al. | 372/6 |
| 5,216,728 | 6/1993 | Charlton et al. | 372/6 |
| 5,218,665 | 6/1993 | Grosso et al. | 359/341 |
| 5,233,463 | 8/1993 | Grosso et al. | 359/341 |

OTHER PUBLICATIONS

Hisao et al. "Influence of Reflected Light on Erbium-Doped Fiber Amplifiers for Optical AM Video Signal Transmission Systems", Journal of Lightwave Technology, vol. 10, No. 8, Aug. 1992, pp. 1132–1136.
Shigematsu et al.; "Optical Fiber Amplifiers for Optical AM-VSB Transmission"; vol. J75B-1, #'s pp. 314–322, 1992; Translation attached.
Massicott et al.; Electronics Letters, vol. 26, #14; Jul. 5, 1990; pp. 1038–1039.

Primary Examiner—Nelson Moskowitz
Attorney, Agent, or Firm—W. J. Simmons, Jr.

[57] ABSTRACT

Disclosed is a fiber amplifier including a gain fiber and a source of pump power having a wavelength $\lambda_p$ coupled to one end thereof. A signal of wavelength $\lambda_s$ is introduced into a first end of the gain fiber, and an amplified signal of wavelength $\lambda_s$ is coupled from the second end thereof. The signal can traverse an undesired secondary path as well as a preferred primary path to the amplifier output. To prevent light of wavelength $\lambda_s$ from traversing the secondary path and thus increasing the amplifier noise figure, the amplifier includes attenuating fiber means for attenuating that portion of the signal of wavelength $\lambda_s$ that propagates in the secondary path.

20 Claims, 2 Drawing Sheets

AMPLIFIER HAVING PUMP FIBER FILTER

BACKGROUND OF THE INVENTION

The present invention relates to a doped optical fiber amplifier having an improved amplifier noise figure.

Doped optical fiber amplifiers consist of an optical fiber the core of which contains a dopant such as rare earth ions. Such an amplifier receives an optical signal of wavelength $\lambda_s$ and pump power of wavelength $\lambda_p$ which are combined by means such as one or more pump/signal wavelength division multiplexer (WDM) couplers located at one or both ends of the amplifier.

One of the key characteristics of a fiber optic amplifier is its noise figure, which is the ratio of the signal-to-noise ratio at the amplifier input and the signal-to-noise ratio at the amplifier output when the input noise is shot noise only. The noise figure characterizes the amount of noise the fiber amplifier adds to the signal. A signal is input to the amplifier and follows a primary signal path to the amplifier output. Fundamental unavoidable noise is generated in this direct path by spontaneous emission produced by the gain fiber and gives rise to a minimum noise figure. Excess noise is generated in the amplifier when a portion of the signal follows a second path and arrives at the output at some time delay relative to the signal in the primary path, thereby generating multipath interference. One potential second path is a path formed by signals that experience two reflections somewhere inside the amplifier. In most amplifiers the largest source of reflections is the facets and coupling lenses of the pump lasers. Signal light reaches the pump laser facets due to the less than infinite isolation of the pump/signal WDM coupler. If the signal can be prevented from reaching the laser facet, the principal source of reflection within the amplifier can be removed, and the noise figure can be significantly reduced.

Multi-path interference also occurs in two stage amplifiers wherein residual pump power from the output of the first stage is coupled to the second stage by a pump path that is distinct from the signal path but which, due to poor isolation, propagates a small amount of signal. The signal component reaching the second stage via the pump path is delayed and out of phase with the direct signal and therefore converts the laser phase noise to intensity noise.

SUMMARY OF THE INVENTION

It is therefore an object of the present invention to improve the noise figure of a fiber amplifier. Another object is to provide a fiber amplifier having means for attenuating that portion of the signal that reaches the amplifier output via a secondary signal path.

Briefly, the present invention relates to a fiber amplifier that includes gain fiber means having an input end and an output end. Pump power of wavelength $\lambda_s$ is coupled from a source to one end of the gain fiber means. Input means introduces a signal of wavelength $\lambda_s$ into the input end of the gain fiber means, the introduced signal traversing a preferred, designated path through the gain fiber means from the input means to the output end of the gain fiber means, whereby an amplified signal of wavelength $\lambda_s$ appears at the output end. The introduced signal also traverses a secondary path through the gain fiber means or through a parallel path which then rejoins the direct path. That portion of the signal traversing the secondary path would, if unattenuated, increase the noise factor of the amplifier. In accordance with the invention, attenuating fiber means are provided for attenuating that portion of the signal that traverses the secondary path to the output end of the gain fiber means.

In one embodiment the gain fiber means comprises a gain fiber having first and second ends, the signal being introduced at the first end thereof. Means is provided for coupling pump power from a pump source to one end of the gain fiber, whereby an amplified signal appears at the second end of the gain fiber. The attenuating fiber means substantially prevents the propagation of power of wavelength $\lambda_s$ from the gain fiber to the pump source.

In another embodiment the gain fiber means comprises first and second gain fiber sections, each having an input end and an output end. Means is provided for coupling pump power of wavelength $\lambda_p$ from a source to the input end of the first gain fiber section. The length of the first gain fiber section is insufficient to absorb all of the pump power from the pump source, whereby residual pump power appears at the output end of the first gain fiber section. Input means introduces a signal of wavelength $\lambda_s$ into the input end of the first gain fiber section, whereby an amplified signal of wavelength $\lambda_s$ appears at the output end of the first gain fiber section. Filtering means filters the amplified signal and couples the filtered signal to the input end of the second gain fiber section. A pump power path couples the residual pump power from the output end of the first gain fiber section to the second gain fiber section. The attenuating fiber means is placed in the pump power path for attenuating that portion of the signal that traverses the pump power path.

The attenuating fiber means may comprise an optical fiber containing a dopant that absorbs power at wavelength $\lambda_s$ while propagating power at wavelength $\lambda_p$ with little attenuation. Especially useful as the attenuating fiber means is an optical fiber doped with rare earth ions.

Alternatively, the attenuating fiber means comprises a coil of optical fiber, the radius of the coil and the number of turns in the coil being sufficient to cause the radiation of a substantial amount of the power at wavelength $\lambda_s$ while very little power at wavelength $\lambda_p$ is radiated from the coil.

DESCRIPTION OF THE PREFERRED EMBODIMENTS

Figure 1:
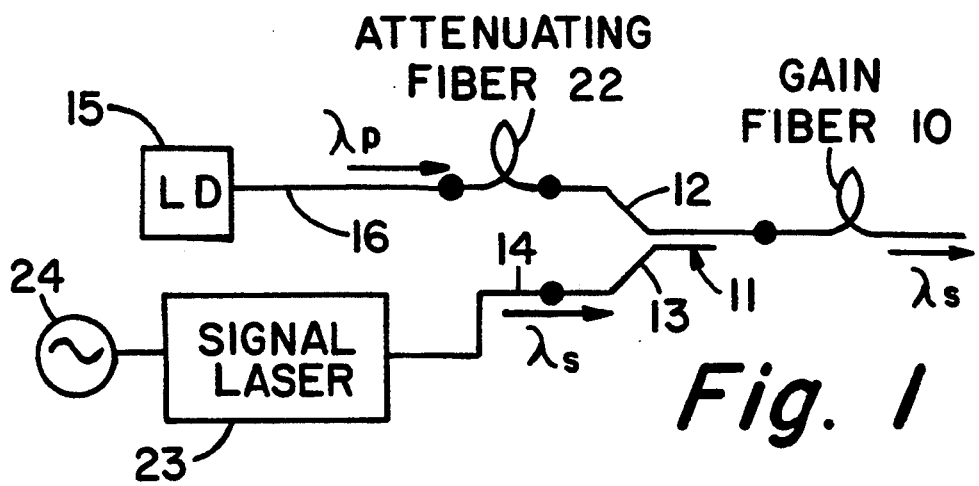
FIG. 1 is a schematic illustration of a forward pumped fiber amplifier.

Fiber amplifiers typically include a gain fiber 10 (FIG. 1), the core of which is doped with gain ions that are capable of producing stimulated emission of light within a predetermined band of wavelengths including a wavelength $\lambda_s$ when pumped with light of wavelength $\lambda_p$ that is outside the predetermined band. A WDM fiber optic coupler 11 can be used for coupling pump energy of wavelength $\lambda_p$ from laser diode 15 and the signal of wavelength $\lambda_s$ from signal laser 23 to gain fiber 10. Such amplifier devices are disclosed in U.S. Pat. Nos. 4,938,556, 4,941,726, 4,955,025 and 4,959,837. Laser 23 is modulated by a source 24, and its output is connected to coupler 11 by input fiber 14. Fusion splices are represented by large dots in the drawings. Fiber 14 is spliced to coupler fiber 13, and gain fiber 10 is spliced to coupler fiber 12. Splice losses are minimized when coupler 11 is formed in accordance with the teachings of U.S. Pat. No. 5,179,603, whereby the mode field diameter of coupler fiber 12 substantially matches that of gain fiber 10.

Some of the amplified signal from gain fiber 10 can reflect from another component and/or from the fibers by Rayleigh scattering, and such reflected light can propagate through gain fiber 10 to coupler 11. Pump light source 15 is conventionally provided with an optical fiber 16. If fiber 16 were connected directly to coupler fiber 12, some of this reflected amplified signal at wavelength $\lambda_s$ would leak through WDM coupler 11 and reach the facet of the pump laser 15. Such signal light reflects from the facet back to gain fiber output where it becomes a source of noise.

In accordance with this invention an attenuating fiber 22 is interposed between pump fiber 16 and coupler fiber 12. The optical characteristics of fiber 22 are such that it attenuates signal light at wavelength $\lambda_s$, and it propagates pump power at wavelength $\lambda_s$, with very low loss. Thus, essentially all of the pump power from source 15 reaches gain fiber 10, but signal light from the gain fiber is isolated from the pump source. The S/P ratio (the ratio of the attenuation at signal wavelengths to the attenuation at pump wavelengths) depends upon the particular amplifier. Normally, the S/P ratio should be as high as possible. However, if there is excess pump power, then perhaps as much as a 3 dB pump power loss could be tolerated. For the case in which the attenuating fiber provides only minimal attenuation of the signal, the S/P ratio could be as low as about 2:1.

Figure 2:
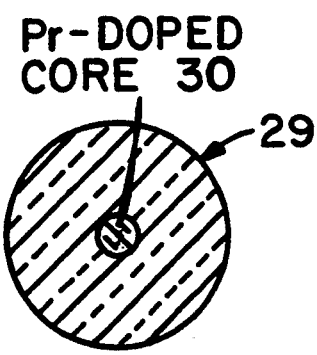
FIGS. 2 and 3 show two different types of attenuating fibers that can be employed in the amplifier of FIG. 1.

In the embodiment shown in FIG. 2, attenuating fiber 29 comprises a length of optical fiber that contains a dopant that absorbs light at the signal wavelength $\lambda_s$ while propagating essentially all of the light at pump wavelength $\lambda_p$. It is preferred that at least core 30 of fiber 29 contain the absorbing dopant since signal power is greatest in that region of the fiber. When high concentrations of rare earths such as Pr are used to dope glasses, light within their absorption bands is absorbed without appreciable subsequent light emission. The $^3F_3$ level of praseodymium ($Pr^{3+}$) yields a very strong absorption band that is peaked at 1440 nm. The tail of this absorption extends to block the passage of Er amplifier signal light and spontaneous emission, which occur within the band at 1525–1570 nm. Absorption of pump power at 980 nm is small.

Attenuating fiber dopants that are suitable for use with an Er-doped gain fiber are praseodymium ($Pr^{3+}$), terbium ($Tb^{3+}$), dysprosium ($Dy^{3+}$) and samarium ($Sm^{3+}$).

The rare earths praseodymium ($Pr^{3+}$) and neodymium ($Nd^{3+}$) can be used as the gain material at 1300 nm. When the gain fiber contains one of these rare earths, then one or more of the rare earths thulium ($Tm^{3+}$), holmium ($Ho^{3+}$), dysprosium ($Dy^{3+}$) and samarium ($Sm^{3+}$) can be used in the attenuating fiber. In addition, praseodymium ($Pr^{3+}$) can be used in the attenuating fiber if neodymium ($Nd^{3+}$) is the gain fiber dopant.

For a material having signal gain at 850 nm, thulium ($Tm^{3+}$), holmium ($Ho^{3+}$), dysprosium ($Dy^{3+}$), neodymium ($Nd^{3+}$) and erbium ($Er^{3+}$) are potential signal filtering dopants.

Figure 3:
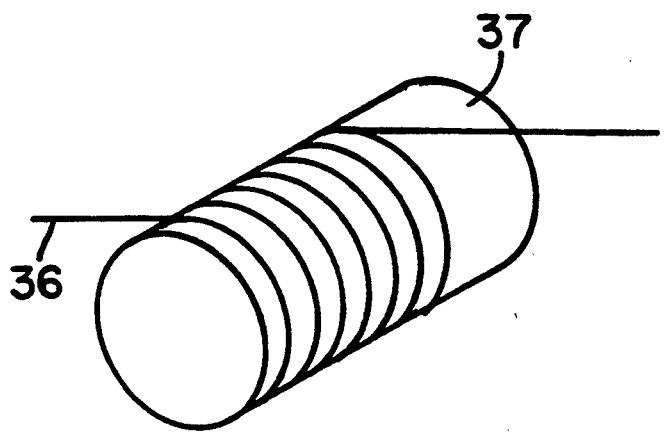

A second embodiment of the invention employs an attenuating fiber that utilizes the principle of optical fiber bend loss. In all optical amplifiers the signal laser is at a longer wavelength than the pump laser. Bend loss in optical fibers increases rapidly with wavelength. As shown in FIG. 3, fiber 36 can be bent into a coil, optionally around a mandrel 37. The fiber coil passes the pump light (980 nm in the case of Er fiber amplifiers) and attenuates the signal light (1525–1570 nm for Er fiber amplifiers). Any optical fiber could be employed as such an attenuating fiber by using a coil having a sufficient number of turns of fiber, wherein the turns are of sufficiently small radius, depending upon the fiber bend loss characteristics. A desirable characteristic for such a fiber would be a small mode field diameter at pump wavelength and a large mode field diameter at the longer signal wavelength. An optimum fiber could be designed which would have a small mode field diameter at 980 nm, but, perhaps due to a depressed cladding, as in a W-type optical fiber, for example, would be very bend loss sensitive at 1550 nm. Single-mode W-fibers are disclosed in published European patent application 0 131 634, for example. With such a fiber, less fiber and/or larger diameter coils could be used. Larger diameter coils may be required to prevent fiber strength degradation.

The filter of the present invention is useful in various fiber amplifier configurations. For example, in the forward-and backward pumped device of FIG. 4, coupler 43 couples the signal from input telecommunication fiber 45 and pumping power from first pump source 44 to gain fiber 53, as described in conjunction with FIG. 1. Coupler 47 couples pumping power from second pump source 48 to gain fiber 53. The output signal of wavelength $\lambda_s$ is coupled by coupler 47 from gain fiber 53 to outgoing telecommunication fiber 50. The ends of pump light attenuating fiber 51 are spliced to pump fiber 55 and coupler fiber 57. The ends of pump light attenuating fiber 52 are spliced to pump fiber 56 and coupler fiber 58. The optical characteristics of attenuating fibers 51 and 52 are the same as those of attenuating fiber 22 of FIG. 1, whereby those fibers attenuate signal light at wavelength $\lambda_s$, and they propagate pump power at wavelength $\lambda_p$ with low loss. Thus, essentially all of the pump power from sources 44 and 48 reaches gain fiber 53, but the signal light from the gain fiber is isolated from the pump sources.

Figure 4:
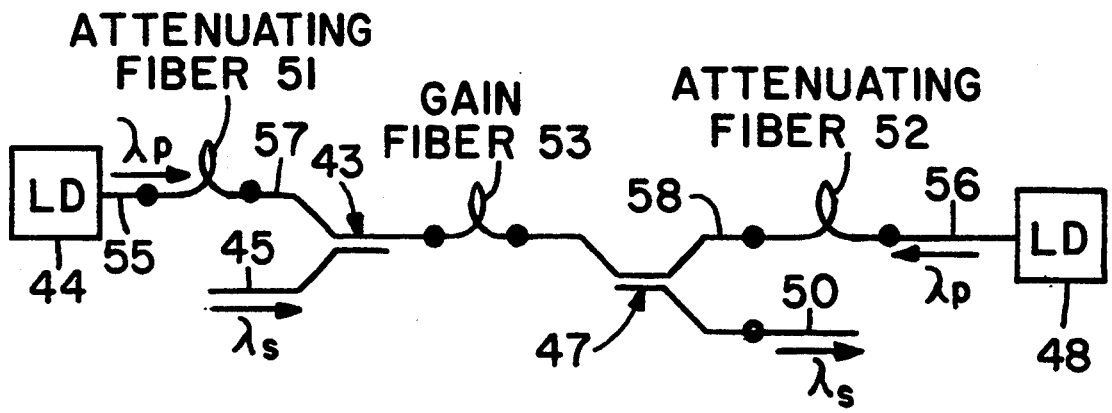
FIG. 4 is a schematic illustration of a forward- and backward-pumped fiber amplifier.

The filter arrangement of the present invention also applies to reverse pumped amplifiers. Referring to FIG. 4, if source 44, fiber 55 and attenuating fiber 51 were omitted, gain fiber 53 would be reverse pumped by source 48.

Figure 5:
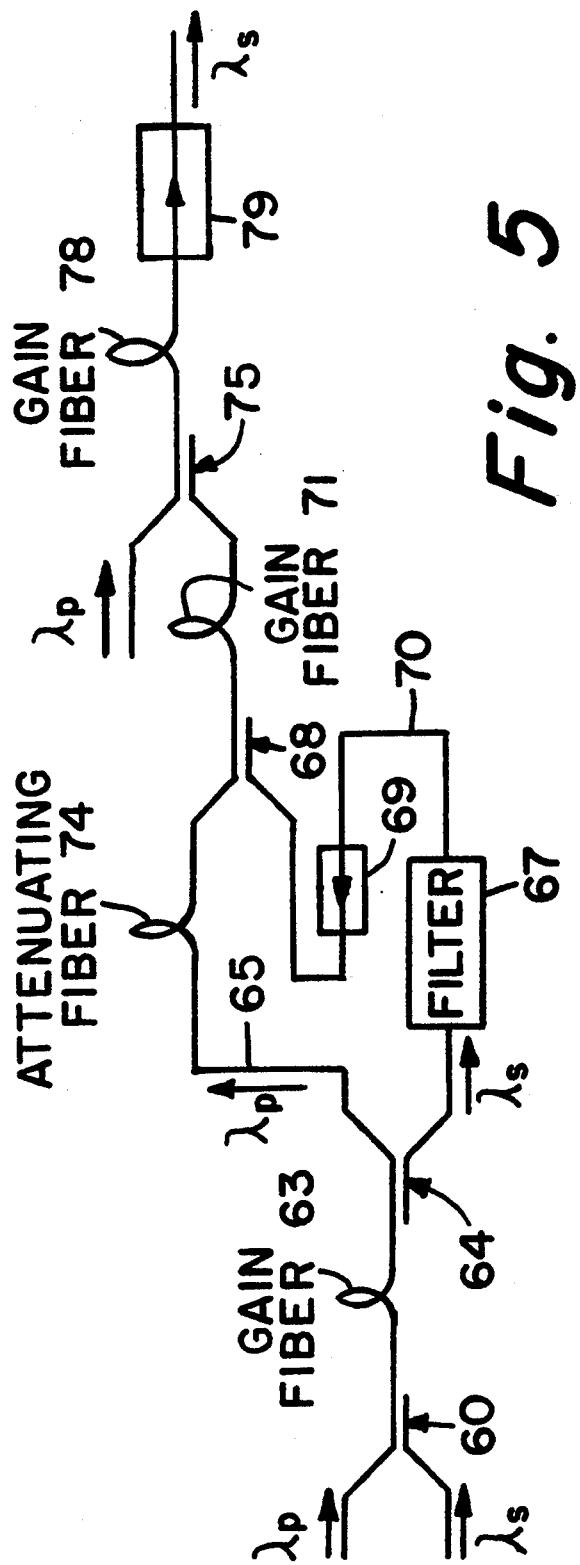
FIG. 5 is a schematic illustration of a multi-stage fiber amplifier having means for feeding residual pump power from one stage to a subsequent stage.

FIG. 5 shows a multi-stage amplifier having gain fibers 63, 71 and 78. The specific wavelengths discussed in connection with the description of this embodiment assume that the gain material is erbium ($Er^{3+}$) which amplifies signals in the wavelength range 1525 to 1570 nm. The input signal and pump power are coupled to gain fiber 63 by WDM coupler 60. The amplified signal is coupled to gain fiber 71 by a signal path that includes isolator 69 and WDM couplers 64 and 68. The signal output from gain fiber 71 is coupled by WDM coupler 75 to gain fiber 78. The amplified signal is connected to the amplifier output by isolator 79.

In the embodiment of FIG. 5, not all of the pump power is absorbed by gain fiber 63, it being desired that the residual pump power be coupled to second stage gain fiber 71. A filter 67 is often placed between the first and second stages of amplification for filtering out amplified spontaneous emission below 1540 nm. Such filtering helps to increase the gain beyond 1540 nm in subsequent stages. However, this filter does not pass 980 nm or 1480 nm pump light. If the residual pump power from the first stage of amplification is to be recovered, a second path must be provided for the pump light; this is the function of the pump path 65. Unfortunately, due to the finite signal crosstalk of the second and third WDM couplers 64 and 68, respectively, some signal light leaks into the pump path. This signal will be out of synchronization with the principle signal where the paths rejoin at the second stage coupler 68 due to inevitable small differences in path length between the two paths. This unsynchronized signal will be a source of added noise. It has been calculated that with WDM couplers 64 and 68 having 15 dB crosstalk at the signal wavelength, this 30 dB attenuated signal will degrade the noise figure by as much as 26 dB, when the path lengths differ by more than the source coherence length.

To block this secondary signal path, which would ordinarily occur through pump path 65, a signal attenuating fiber 74 is added to path 65. It has been calculated that 60 dB signal attenuation in path 65 would eliminate this additional source of noise. This could easily be obtained with one meter of praseodymium ($Pr_{3+}$)-doped fiber or through bend loss of a coiled fiber. As discussed above, other signal absorbing fibers could be employed.

EXAMPLE 1

A fiber amplifier was formed in accordance with the circuit illustrated in FIG. 1. Gain fiber 10 had a core diameter of 3.34 $\mu$m and a core-clad $\Delta$ of 1.03% wherein $\Delta=(n_1^2-n_2^2)/2n_1^2$, $n_1$ and $n_2$ being the core refractive index, respectively. The fiber core was formed of $SiO_2$ doped with $GeO_2$, $Al_2O_3$ and $Er_2O_3$; the cladding was formed of $SiO_2$. Pump 15 was a laser diode operating at 980 nm. The signal wavelength was 1542 nm. The noise figure was measured at a frequency of 55 MHz.

The entire core of attenuating fiber 22 was formed of $SiO_2$ doped with 5 wt. % $GeO_2$, and the center of the core was doped with 1 wt. % $Pr_2O_3$. The cladding was formed of $SiO_2$. The fiber was doped with 1 wt. % fluorine throughout its radius. The attenuation of this fiber was 70 dB/m and 0.2 dB/m at 1550 and 980 nm, respectively. The tail of the 1 G4 absorption is responsible for the small amount of 980 nm loss. The mode field diameter of this fiber did not match that of the pump fiber 16; therefore, the splice losses between the Pr-doped fiber 22 and both pump fiber 16 and coupler fiber 12 were greater than 1 dB. These large splice losses can be eliminated by more closely matching the mode field diameters of the attenuating fiber to fibers 12 and 16, and/or by employing a multi-arc fusion splice process.

When the amplifier was operated without attenuating fiber 29, the noise figure was 6.7 dB. When the amplifier was operated with attenuating fiber 29, the noise figure was 4.4 dB.

EXAMPLE 2

A fiber amplifier was formed in accordance with the circuit illustrated in FIG. 1. The same type of gain fiber and pump diode were employed, and the modulation frequency was again 55 MHz.

Attenuating fiber 36 consisted of 20 turns of fiber wrapped around a mandrel having a radius of 6.3 mm. Attenuating fiber 36 had a radius of 125 $\mu$m and had a mode field diameter of 7.0 $\mu$m at 1550 nm and 4.25 $\mu$m at 1000 nm. The core was doped with $GeO_2$, the core-clad $\Delta$ being 1%. The cladding was formed of $SiO_2$. Its total attenuation at 1530 nm was 10 dB and at 980 nm was 0 dB.

When the amplifier was operated without attenuating fiber 36, the noise figure was 7.5 dB. When the amplifier was operated with attenuating fiber 36, the noise figure was 6.1 dB.

Figure 6:
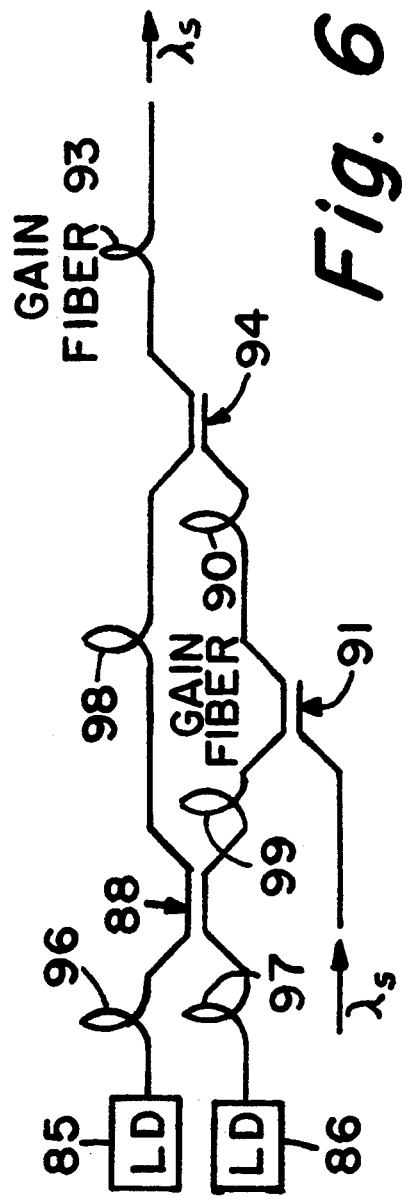
FIG. 6 is a schematic illustration of a multi-stage fiber amplifier in which the attenuating fibers are used in connection with a fail safe pump source.

The principles of the invention also apply to fail safe pump sources such as that illustrated in FIG. 6. Two laser diodes 85 and 86 are connected to a 3 dB coupler 88, the output legs of which provide equal amounts of pump power to two different gain fibers. One leg of coupler 88 is connected to gain fiber 90 by a WDM coupler 91. The input signal of wavelength $\lambda_s$ is also connected to coupler 91. The amplified signal from fiber 90 is coupled to gain fiber 93 by WDM coupler 94 which also couples pump power from 3 dB coupler 88 to gain fiber 93. If one of the sources 85 and 86 fails, the remaining one provides the gain fibers with half the original amount of power. In this embodiment, attenuating fibers 96 and 97, which are similar to fiber 22 of FIG. 1, are connected between the 3 dB coupler and laser diodes 85 and 86, respectively. In addition, a third attenuating fiber 98 may be inserted between the 3 dB coupler 88 and WDM coupler 94, and a fourth attenuating fiber 99 may be inserted between the 3 dB coupler 88 and WDM coupler 91. Attenuating fibers 98 and 99 attenuate reflections that attenuating fibers 96 and 97 would not attenuate.

We claim:
1. A one-way fiber amplifier comprising
   gain fiber means having an input end and an output end,
   means for coupling pump power of wavelength $\lambda_p$ from a source to one end of said gain fiber means,
   input means for introducing a signal of wavelength $\lambda_s$ into the input end of said gain fiber means, said introduced signal traversing a preferred, designated path from said input means through said gain fiber means to the output end of said gain fiber means, whereby an amplified signal of wavelength $\lambda_s$ appears at said output end, a portion of said introduced signal traversing a secondary path through said gain fiber means, that portion of said signal that traverses said secondary path would, if unattenuated, increase the noise factor of said amplifier, there being no further input signals applied to said gain fiber means, and
   attenuating fiber means for attenuating only that portion of said signal that traverses said secondary path to said output end of said gain fiber means while leaving pump power substantially unattenuated, thereby preventing an increase in the noise factor of said amplifier that would have occured had said signal traversed said secondary path unattenuated.

2. A fiber amplifier in accordance with claim 1 wherein said input means is a wavelength division multiplexer coupler.

3. A fiber amplifier in accordance with claim 1 wherein said attenuating fiber means is disposed in the light path between said pump source and said gain fiber means.

4. A fiber amplifier in accordance with claim 1 wherein said attenuating fiber means comprises an optical fiber containing a dopant that absorbs power at wavelength $\lambda_s$ while propagating power at wavelength $\lambda_p$.

5. A fiber amplifier in accordance with claim 1 wherein said attenuating fiber means comprises a coil of optical fiber, the radius of said coil and the number of turns in said coil being sufficient to cause the radiation of a substantial amount of the power at wavelength $\lambda_s$.

6. A fiber amplifier in accordance with claim 1 wherein said gain fiber means comprises first and second gain fiber sections, each having an input end and an output end, said pump source being coupled to the input end of said first gain fiber section, the length of said first gain fiber section being insufficient to absorb all of the pump power from said pump source, whereby residual pump power appears at the output end of said first gain fiber section along with an amplified signal, filtering means for filtering said signal and for coupling the filtered signal to said second gain fiber section, and a pump power path for coupling said residual pump power from said first gain fiber section to said second gain fiber section, said attenuating fiber means being situated in said pump power path.

7. A fiber amplifier in accordance with claim 6 wherein said attenuating fiber means comprises an optical fiber containing a dopant that absorbs power at wavelength $\lambda_s$ while propagating power at wavelength $\lambda_p$.

8. A fiber amplifier in accordance with claim 6 wherein said attenuating fiber means comprises a coil of optical fiber, the radius of said coil and the number of turns in said coil being sufficient to cause the radiation of a substantial amount of the power at wavelength $\lambda_s$ 9. A fiber amplifier comprising
a gain fiber having first and second ends,
means for introducing a signal of wavelength $\lambda_s$ into the first end of said gain fiber,
a source of pump power having a wavelength $\lambda_p$,
means for coupling pump power from said pump source to one end of said gain fiber, whereby an amplified signal of wavelength $\lambda_s$ appears at the second end of said gain fiber, and
attenuating fiber means for substantially preventing the propagation of power of wavelength $\lambda_s$ from said gain fiber to said pump source.

10. A fiber amplifier in accordance with claim 9 wherein said gain fiber contains erbium ($Er^{3+}$) and said attenuating fiber means comprises an optical fiber containing a dopant that absorbs power at wavelength $\lambda_s$ while propagating power at wavelength $\lambda_p$, said dopant being one or more of the group consisting of praseodymium ($Pr^{3+}$), terbium ($Tb^{3+}$), dysprosium ($Dy^{3+}$) and samarium ($Sm^{3+}$).

11. A fiber amplifier in accordance with claim 9 wherein said gain fiber contains praseodymium ($Pr^{3+}$) or neodymium ($Nd^{3+}$) and said attenuating fiber means comprises an optical fiber containing a dopant that absorbs power at wavelength $\lambda_s$ while propagating power at wavelength $\lambda_p$, said dopant being one or more of the group consisting of thulium ($Tm^{3+}$), holmium ($Ho^{3+}$), dysprosium ($Dy^{3+}$) and samarium ($Sm_{3+}$).

12. A fiber amplifier in accordance with claim 9 wherein said gain fiber contains neodymium ($Nd^{3+}$) and said attenuating fiber means comprises an optical fiber containing praseodymium ($Pr^{3+}$) which absorbs power at wavelength $\lambda_s$ while propagating power at wavelength $\lambda_p$.

13. A fiber amplifier in accordance with claim 9 wherein said attenuating fiber means comprises a coil of optical fiber, the radius of said coil and the number of turns in said coil being sufficient to cause the radiation of a substantial amount of the power at wavelength $\lambda_s$ 14. A fiber amplifier in accordance with claim 13 wherein said coil of optical fiber comprises an optical fiber having a W-type refractive index profile.

15. A fiber amplifier in accordance with claim 9 wherein said pump power source is connected to that end of said gain fiber to which said signal is introduced.

16. A fiber amplifier in accordance with claim 9 wherein said pump power source is connected to that end of said gain fiber opposite that end to which said signal is introduced.

17. A fiber amplifier in accordance with claim 9 wherein said pump power source is connected to both ends of said gain fiber.

18. A fiber amplifier comprising
first and second gain fiber sections, each having an input end and an output end,
means for coupling pump power of wavelength $\lambda_p$ from a source to the input end of said first gain fiber section, the length of said first gain fiber section being insufficient to absorb all of the pump power from said pump source, whereby residual pump power appears at the output end of said first gain fiber section,
input means for introducing a signal of wavelength $\lambda_s$ into the input end of said first gain fiber section, an amplified signal of wavelength $\lambda_s$ appearing at the output end of said first gain fiber section,
filtering means for filtering said amplified signal and for coupling the filtered signal to the input end of said second gain fiber section,
a pump power path for coupling said residual pump power from the output end of said first gain fiber section to said second gain fiber section, and
attenuating fiber means in said pump power path for attenuating that portion of said signal that traverses said pump power path.

19. A fiber amplifier in accordance with claim 18 wherein said attenuating fiber means comprises an optical fiber containing a dopant that absorbs power at wavelength $\lambda_s$ while propagating power at wavelength $\lambda_p$.

20. A fiber amplifier in accordance with claim 18 wherein said attenuating fiber means comprises a coil of optical fiber, the radius of said coil and the number of turns in said coil being sufficient to cause the radiation of a substantial amount of the power at wavelength $\lambda_s$.

* * * * *